United States Patent
Panje

(10) Patent No.: US 11,889,316 B2
(45) Date of Patent: *Jan. 30, 2024

(54) IN HOME WI-FI CHANNEL SCANNING ENHANCEMENTS

(71) Applicant: ARRIS Enterprises LLC, Suwanee, GA (US)

(72) Inventor: Krishna Prasad Panje, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 304 days.

This patent is subject to a terminal disclaimer.

(21) Appl. No.: 17/416,843

(22) PCT Filed: Dec. 19, 2019

(86) PCT No.: PCT/US2019/067376
§ 371 (c)(1),
(2) Date: Jun. 21, 2021

(87) PCT Pub. No.: WO2020/132185
PCT Pub. Date: Jun. 25, 2020

(65) Prior Publication Data
US 2022/0086650 A1    Mar. 17, 2022

Related U.S. Application Data

(63) Continuation of application No. 16/227,917, filed on Dec. 20, 2018, now Pat. No. 10,841,837.

(51) Int. Cl.
*H04W 16/10* (2009.01)
*H04W 28/08* (2023.01)
(Continued)

(52) U.S. Cl.
CPC ......... *H04W 16/10* (2013.01); *H04W 28/082* (2023.05); *H04W 28/0862* (2023.05);
(Continued)

(58) Field of Classification Search
None
See application file for complete search history.

(56) References Cited

U.S. PATENT DOCUMENTS 10,841,837 B2 * 11/2020 Panje ............... H04W 28/0862
2016/0142967 A1    5/2016 Lee
2018/0332583 A1   11/2018 Shah et al.

FOREIGN PATENT DOCUMENTS

GB         2498824      7/2013
WO      2018/146038     8/2018

OTHER PUBLICATIONS

International Search Report and Written Opinion of the International Searching Authority dated Mar. 26, 2020, in International (PCT) Application No. PCT/US2019/067376

(Continued)

*Primary Examiner* — Diane L Lo
(74) *Attorney, Agent, or Firm* — Wenderoth, Lind & Ponack, L.L.P.

(57) ABSTRACT

A system, such as a gateway, is provided for use with a first access point device and a second access point device to scan channels within a spectrum of channels. The system includes; a delegating component that is operable to instruct the first access point device to monitor for a presence of a signal on any one of a first set of channels within a spectrum of channels and to instruct the second access point device to monitor for a presence of a signal on any one of a second set of channels within a spectrum of channels; a communication component operable to receive a channel-in-use signal from the first access point device and to transmit a notification signal to the second access point device based on the channel-in-use signal, the channel-in-use signal being associated with an in-use channel of the first set of channels within the spectrum of channels, the communication component is additionally operable to transmit the instruction to (Continued)

the first access point device and the second access point device, the communication component is further operable to receive a communication signal from one of the first access point device and the second access point device as a result of the transmission of the instruction; and a load balancing component operable to determine a communication volume on each of the first set of channels within the spectrum of channels, and to generate an instruction to instruct the first access point device and the second access point device to not use the in-use channel.

18 Claims, 9 Drawing Sheets

(51) Int. Cl.
H04W 48/16 (2009.01)
H04W 28/082 (2023.01)
H04W 28/086 (2023.01)
H04W 84/12 (2009.01)

(52) U.S. Cl.
CPC ... *H04W 28/0933* (2020.05); *H04W 28/0942* (2020.05); *H04W 48/16* (2013.01); *H04W 84/12* (2013.01)

(56) References Cited

OTHER PUBLICATIONS

Villegas et al., "Load Balancing in WLAN's through IEEE 802.11k Mechanisms", Proceedings of the 11th IEEE Symposium on Computers and Communications (ISCC'06), 2006, pp. 844-850.
International Preliminary Report on Patentability dated Jun. 16, 2021, in International (PCT) Application No. PCT/US2019/067376.
Office Action dated Mar. 31, 2023 in Canadian Application No. 3,123,845.

* cited by examiner

IN HOME WI-FI CHANNEL SCANNING ENHANCEMENTS

BACKGROUND

Embodiments of the disclosure relate to devices and methods of using a network access device or system, such as a gateway, with multiple access point devices.

SUMMARY

Aspects of the present disclosure are drawn to a system and method for a gateway or other network access device, and multiple access point devices to monitor available radar frequencies.

An example aspect of the present disclosure is drawn to a system, such as a gateway, for use with a first access point device and a second access point device to scan channels within a spectrum of channels. The system includes a delegating component, a communication component, and a load balancing component. The delegating component is operable to delegate the first access point device to monitor for a presence of a signal on any one of a first set of channels within a spectrum of channels in a radar band of IEEE Standard 802.11h and to delegate the second access point device to monitor a second presence of a second signal on any one of a second set of channels within the spectrum of channels in the radar band of IEEE Standard 802.11h. The communication component is operable to receive a channel-in-use signal from the first access point device and to transmit a notification signal to the second access point device based on the channel-in-use signal, the channel-in-use signal being associated with an in-use channel of the first set of channels within the spectrum of channels in the radar band of IEEE Standard 802.11h. The load balancing component is operable to determine a communication volume on each of the first set of channels within the spectrum of channels in the radar band of IEEE Standard 802.11h and the second set of channels within the spectrum of channels in the radar band of IEEE Standard 802.11h and to generate an instruction to instruct the first access point device and the second access point device to not use the in-use channel. The communication component is additionally operable to transmit the instruction to the first access point device and the second access point device. The communication component is further operable to receive a communication signal from one of the first access point device and the second access point device as a result of the transmission of the instruction.

BRIEF SUMMARY OF THE DRAWINGS

The accompanying drawings, which are incorporated in and form a part of the specification, illustrate example embodiments and, together with the description, serve to explain the principles of the disclosure. In the drawings.

DETAILED DESCRIPTION

Figure 1:
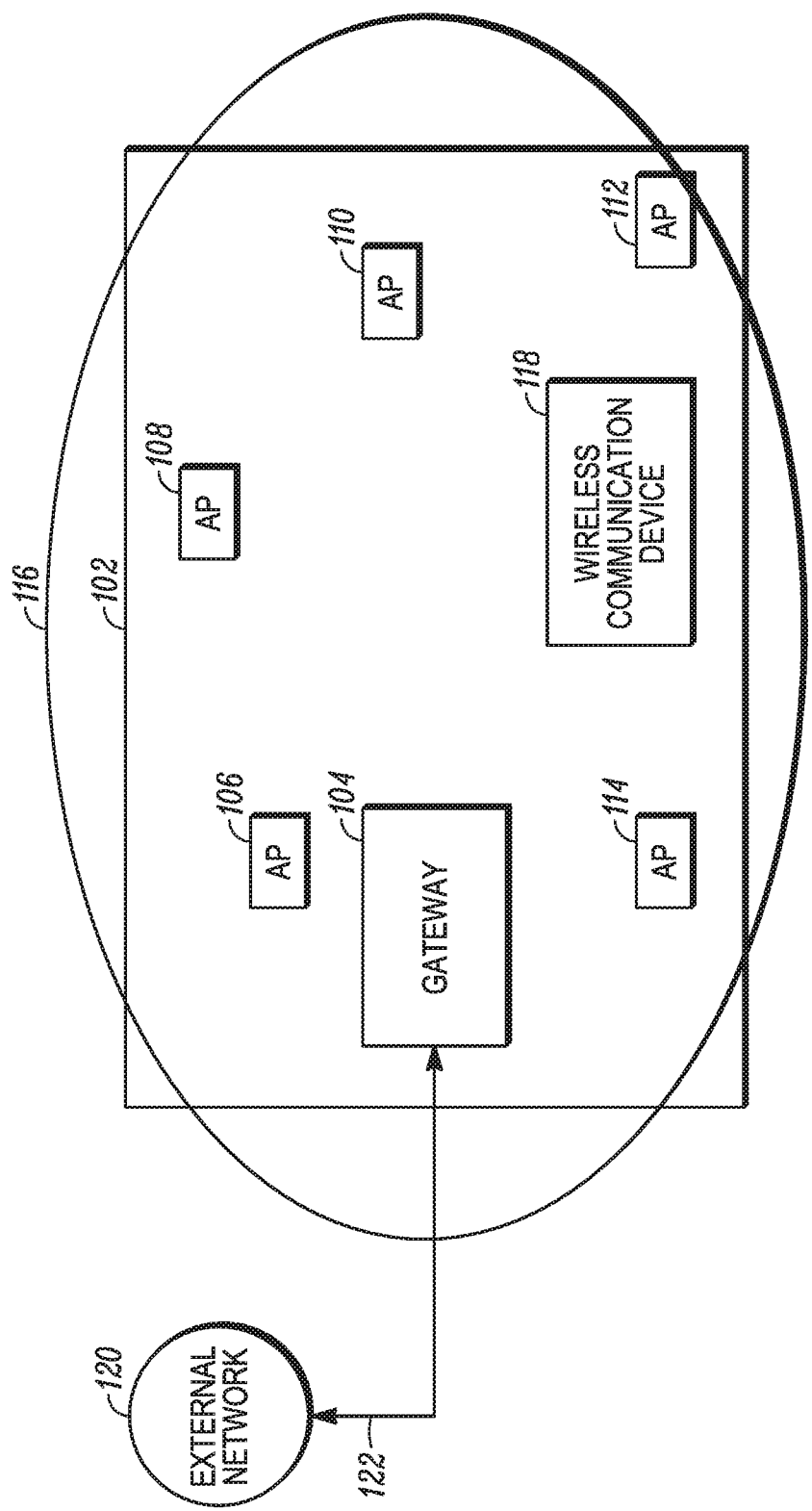
FIG. 1 illustrates a conventional wireless communication system.

There exists a need for a system and method for a network system, such as a gateway, and multiple access point devices to monitor available radar frequencies.

An end-user can buy Wi-Fi access point devices (APDs) (i.e., a Wi-Fi router or a Wi-Fi range extender) from a retail market. The end-user may then use one or more Wi-Fi APDs to provide access to a Wi-Fi network system, such as a Wi-Fi network gateway.

This disclosure describes systems and methods for using a system, such as a gateway, with multiple Wi-Fi APDs.

One prior art method for using multiple Wi-Fi access points to provide access to a network gateway. In the prior art method, an end-user will purchase and configure multiple Wi-Fi APDs that are operable to provide access to a Wi-Fi network gateway. The Wi-Fi network gateway controls each Wi-Fi APD using a home network controller (HNC) along with a Multi AP Protocol (MAP).

IEEE 802.11 is a set of media access control (MAC) and physical layer (PHY) specifications for implementing wireless local area network (WLAN) computer communication in the 900 MHz and 2.4, 3.6, 5, and 60 GHz frequency bands. They are the world's most widely used wireless computer networking standards, used in most home and office networks to allow laptops, printers, and smartphones to talk to each other and access the Internet without connecting wires. They are created and maintained by the Institute of Electrical and Electronics Engineers (IEEE) LAN/MAN Standards Committee (IEEE 802). The base version of the standard was released in 1997, and has had subsequent amendments. The standard and amendments provide the basis for wireless network products using the Wi-Fi brand. While each amendment is officially revoked when it is incorporated in the latest version of the standard, the corporate world tends to market to the revisions because they concisely denote capabilities of their products. As a result, in the marketplace, each revision tends to become its own standard.

The 802.11h specification is an addition to the 802.11 family of standards for wireless local area networks (WLANs). 802.11h is intended to resolve interference issues introduced by the use of 802.11a in some locations, particularly with military radar systems and medical devices.

The rules for 802.11h were recommended by the International Telecommunication Union (ITU) because of problems that arose with interference to and from other devices, especially in Europe. Dynamic frequency selection (DFS) is used to minimize interference between devices in the 5 GHz channels. DFS is a mandate for radio systems operating in the 5 GHz band to be outfitted with a way to identify and take action to avoid other radio transmissions that are considered primary-use or mission-critical. These mission-critical devices are various flavors of radar systems used by specific industrial, federal civilian and military organizations. DFS detects the presence of other devices on a channel and automatically switches the network to another channel if and when such signals are detected.

In prior art method for using multiple Wi-Fi access points to provide access to a network gateway, each Wi-Fi APD within the network will need to continuously scan the full range of frequency channels that are available for use. When a Wi-Fi APD detects that a frequency channel is in use, it will notify the Wi-Fi network gateway of a detection event through the HNC/MAP. The Wi-Fi network gateway will then instruct each Wi-Fi APD that the frequency channel specified in the detection event is in use. Since each Wi-Fi APD is monitoring the full range of channels independently, it is possible that delays could be introduced into the network.

Additionally, each Wi-Fi APD needs to scan the full range of available channels in order to detect other Wi-Fi APDs within the Wi-Fi network. Detecting other Wi-Fi APDs allows multiple Wi-Fi APDs to communicate with each other and avoid operating on the same frequency channel to prevent interference. It would be advantageous to accelerate the scanning of frequency channels to using the Wi-Fi network gateway and HNC/MAP.

A conventional system and method of a network system, such as a gateway, operating with multiple APDs will now be described with reference to FIGS. 1-3.

FIG. 1 illustrates a conventional wireless communication system 100.

As shown in the figure, conventional wireless communication system 100 includes a building 102, a network system, such as gateway 104, a Wi-Fi APD 106, a Wi-Fi APD 108, a Wi-Fi APD 110, a Wi-Fi APD 112, a Wi-Fi APD 114, a wireless communication device 118, and external network 120.

Building 102 may be any structure or home that contains each of gateway 104, Wi-Fi APD 106, Wi-Fi APD 108, Wi-Fi APD 110, Wi-Fi APD 112, Wi-Fi APD 114, and wireless communication device 118.

A network system, such as gateway 104, may be any device or system that is operable to allow data to flow from a network including gateway 104, Wi-Fi APD 106, Wi-Fi APD 108, Wi-Fi APD 110, Wi-Fi APD 112, or Wi-Fi APD 114 to external network 120 via communication channel 122, and to communicate by way of a radar band of IEEE Standard 802.11h.

Wi-Fi APD 106, Wi-Fi APD 108, Wi-Fi APD 110, Wi-Fi APD 112, and Wi-Fi APD 114 may be any device or system that is operable to allow wireless communication device 118 to connect to gateway 104 by way of a radar band of IEEE Standard 802.11h, so as to connect to external network 120.

Wireless network 116 is the network created by gateway 104, Wi-Fi APD 106, Wi-Fi APD 108, Wi-Fi APD 110, Wi-Fi APD 112, Wi-Fi APD 114, and wireless communication device 118.

Wireless communication device 118 may be any device or system that is operable to: wirelessly communicate with at least one of gateway 104, Wi-Fi APD 106, Wi-Fi APD 108, Wi-Fi APD 110, Wi-Fi APD 112, and Wi-Fi APD 114 by way of the Wi-Fi standard. Non-limiting examples of wireless communication device 118 include a smartphone, a tablet and a laptop.

In operation, an end-user will purchase and install each of gateway 104, Wi-Fi APD 106, Wi-Fi APD 108, Wi-Fi APD 110, Wi-Fi APD 112, and Wi-Fi APD 114 in building 102. Once installed, the end-user will turn on the gateway and each Wi-Fi APD in order to configure them for use in order to create wireless network 116 to provide wireless communication device 118 access to external network 120. Once operating, gateway 104 will on-board each of Wi-Fi APD 106, Wi-Fi APD 108, Wi-Fi APD 110, Wi-Fi APD 112, and Wi-Fi APD 114. The process of gateway 104 on-boarding a Wi-Fi APD is well known in the state of the art, and for purposes of brevity will not be further discussed here.

Once gateway 104 has on-boarded each of Wi-Fi APD 106, Wi-Fi APD 108, Wi-Fi APD 110, Wi-Fi APD 112, and Wi-Fi APD 114, wireless network 116 is operational. At this time, wireless network 116 is able to begin operating on a spectrum of channels in a radar band of IEEE Standard 802.11h.

The operation of conventional wireless communication system 100 will now be described with additional reference to FIGS. 2-3.

Figure 2:
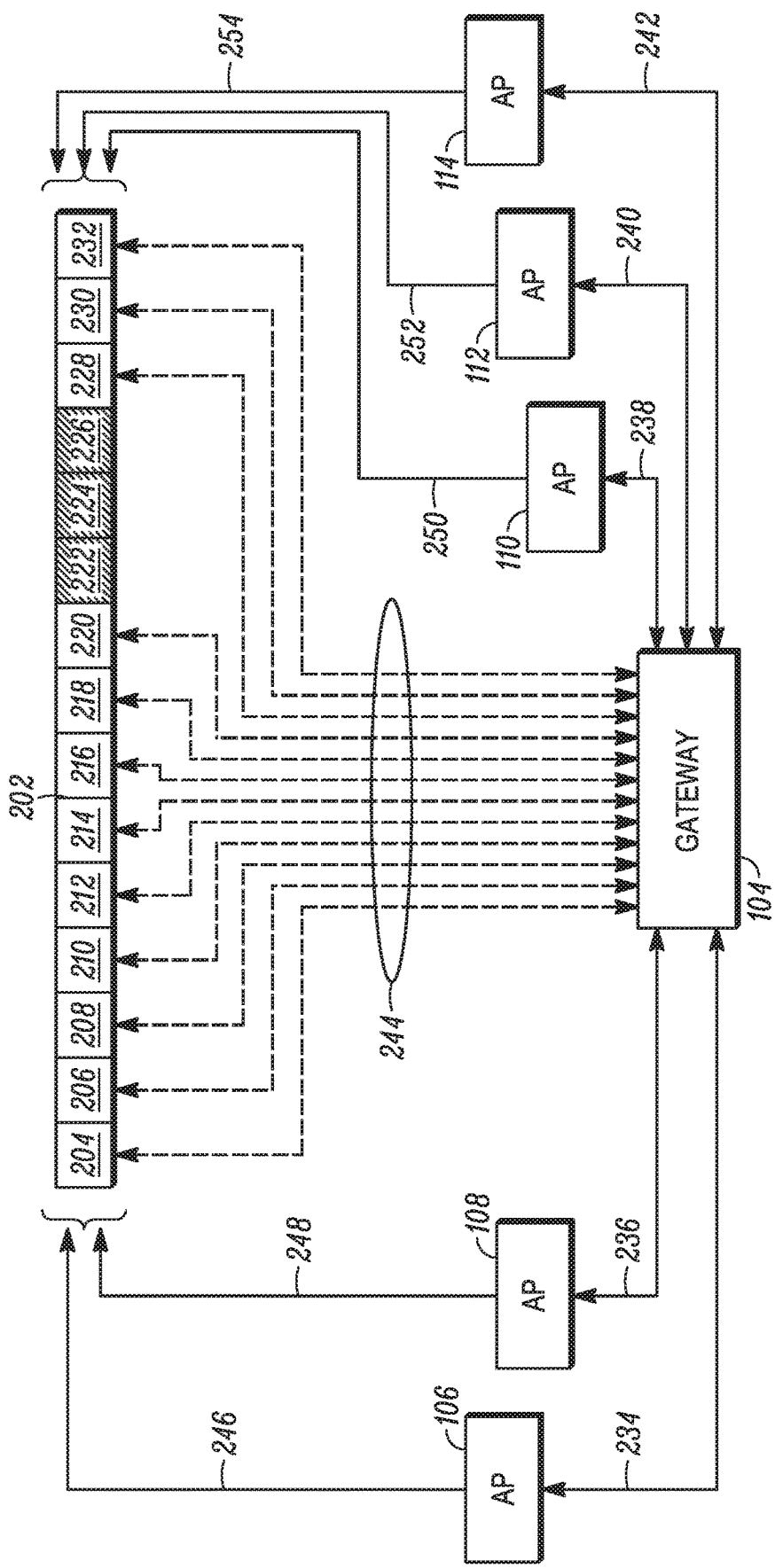
FIG. 2 illustrates the operation of the conventional wireless communication system of FIG. 1.

FIG. 2 illustrates conventional wireless communication system 100 operating over a spectrum of channels in a radar band of IEEE Standard 802.11h.

As shown, the figure includes gateway 104, Wi-Fi APD 106, Wi-Fi APD 108, Wi-Fi APD 110, Wi-Fi APD 112, Wi-Fi APD 114, and a spectrum 202. Spectrum 202 contains channel 204, channel 206, channel 208, channel 210, channel 212, channel 214, channel 216, channel 218, channel 220, channel 222, channel 224, channel 226, channel 228, channel 230, and channel 232.

Channel 204 corresponds to frequency 5260 MHz, channel 206 corresponds to frequency 5280 MHz, channel 208 corresponds to frequency 5300 MHz, channel 210 corresponds to frequency 5320 MHz, channel 212 corresponds to frequency 5500 MHz, channel 214 corresponds to frequency 5520 MHz, channel 216 corresponds to frequency 5540 MHz, channel 218 corresponds to frequency 5560 MHz, channel 220 corresponds to frequency 5580 MHz, channel 222 corresponds to frequency 5600 MHz, channel 224 corresponds to frequency 5620 MHz, channel 226 corresponds to frequency 5640 MHz, channel 228 corresponds to frequency 5660 MHz, channel 230 corresponds to frequency 5680 MHz, and channel 232 corresponds to frequency 5700 MHz.

Each channel within spectrum 202 is available for use by an end user with the exception of channel 222, channel 224, and channel 226. In the United States, channel 222, channel 224, and channel 226 represent channels within in the radar band of IEEE Standard 802.11h that are reserved for government use and are not available to the public. As such, these channels are not monitored or used by the gateway 104 or any Wi-Fi APD 106-114 of conventional wireless communication system 100.

In operation, once gateway 104 has on-boarded each of Wi-Fi APD 106, Wi-Fi APD 108, Wi-Fi APD 110, Wi-Fi APD 112, and Wi-Fi APD 114, gateway 104 will begin to monitor each channel within spectrum 202 for the presence of a radar signal. Gateway 104 monitoring each channel within spectrum 202 is illustrated as channel monitoring bundle 244 in FIG. 2. Similarly, each of Wi-Fi APD 106, Wi-Fi APD 108, Wi-Fi APD 110, Wi-Fi APD 112, and Wi-Fi APD 114 also monitor each channel within spectrum 202 for the presence of a radar signal via channel monitoring bundle 246, channel monitoring bundle 248, channel monitoring bundle 250, channel monitoring bundle 252, and channel monitoring bundle 254, respectively.

Returning to FIG. 1, an end-user will use wireless communication device 118 to access external network 120, via wireless network 116. Wireless communication device 118 will begin by joining wireless network 116 through the closest Wi-Fi APD, which suppose in this example embodiment is Wi-Fi APD 112. As shown in FIG. 2, Wi-Fi APD 112 will then transmit the communication from wireless communication device 118 to gateway 104 over a channel within spectrum 202, which in this example embodiment is channel 210. Once received, gateway 104 will transmit the communication to external network 120 via communication channel 122.

Any return communication from external network 120 intended for the end-user is transmitted from gateway 104 to wireless communication device 118, via wireless network 116. The end-user is able to continue accessing external network 120 in this manner as each of gateway 104, Wi-Fi APD 106, Wi-Fi APD 108, Wi-Fi APD 110, Wi-Fi APD 112, and Wi-Fi APD 114 continue to monitor each channel within spectrum 202 for the presence of a radar signal.

The conventional wireless communication 100 of FIG. 1 detecting a radar signal on a channel within spectrum 202 will now be described with additional reference to FIG. 3.

Figure 3:
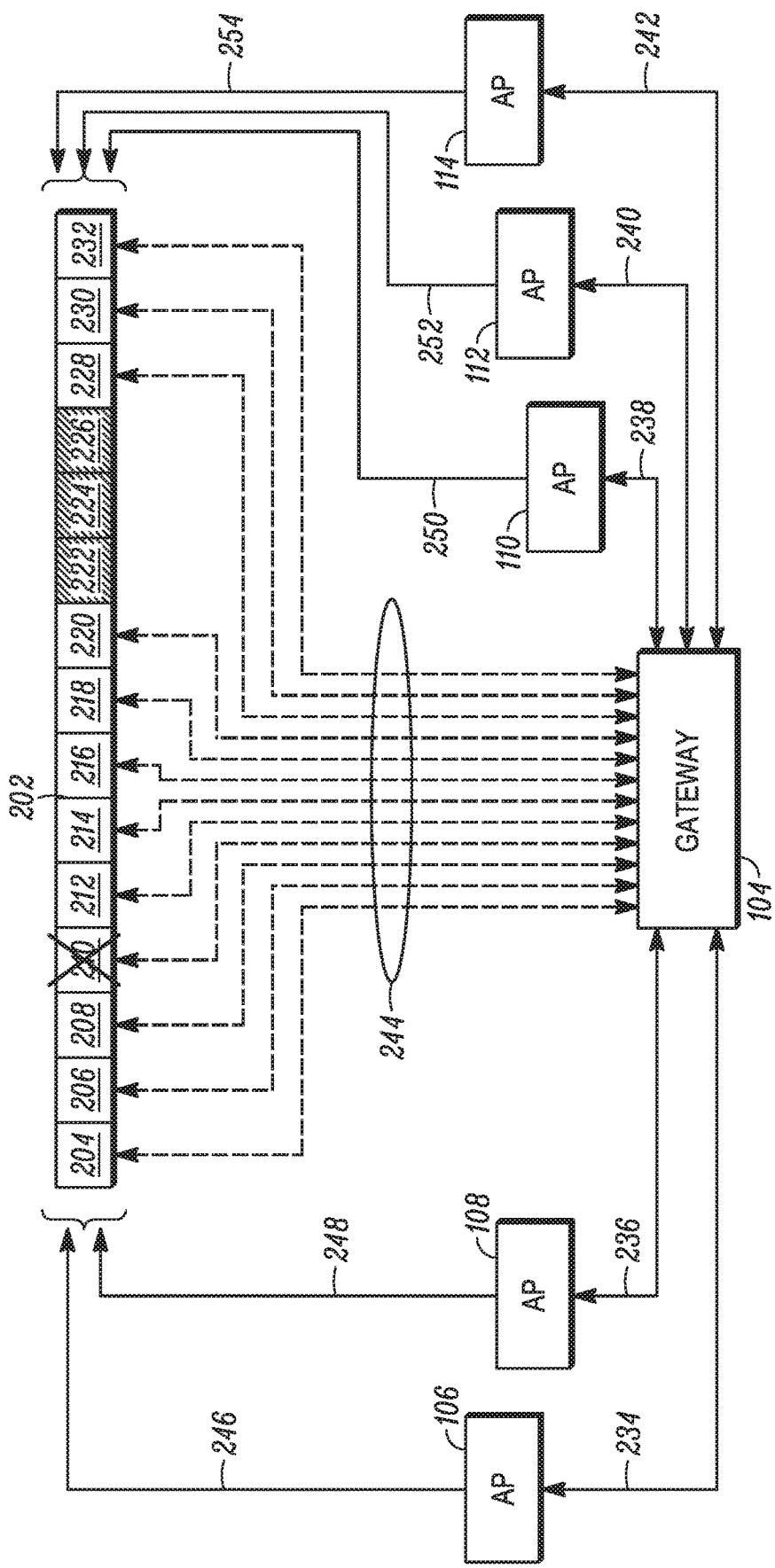
FIG. 3 illustrates the operation of the conventional wireless communication system of FIG. 1.

FIG. 3 illustrates conventional wireless communication system 100 detecting a radar signal on a channel within a spectrum of channels in a radar band of IEEE Standard 802.11h.

In operation, suppose at some time a radar signal is transmitted over channel 210 by an external source (not shown). Each of gateway 104, Wi-Fi APD 106, Wi-Fi APD 108, Wi-Fi APD 110, Wi-Fi APD 112, and Wi-Fi APD 114 are monitoring all of the channels within spectrum 202 independently of each other. Therefore, each of gateway 104, Wi-Fi APD 106, Wi-Fi APD 108, Wi-Fi APD 110, Wi-Fi APD 112, and Wi-Fi APD 114 detects when channel 210 is in use.

Once a radar signal is detected on channel 210, each of gateway 104, Wi-Fi APD 106, Wi-Fi APD 108, Wi-Fi APD 110, Wi-Fi APD 112, and Wi-Fi APD 114 will stop operating on channel 210. In particular, gateway 104 must instruct all of Wi-Fi APD 106, Wi-Fi APD 108, Wi-Fi APD 110, Wi-Fi APD 112, and Wi-Fi APD 114 to operate over the remaining available radar channels 204, 206, 212, 214, 216, 218, 220, 228, 230 and 232.

When a device, such as a Wi-Fi APD 106-114 or gateway 104, scans spectrum 202 to determine whether any channels are in use, the scanning device is unable to transmit or receive other communication signals. Further, the scanning of a channel within spectrum 202 takes a predetermined amount of time $t_s$. Therefore, to scan the entirety of spectrum 202, the total scanning time is $12t_s$, because there are twelve radar channels available to the general public. Accordingly, each scanning device is unable to transmit or receive other communication signals for a time $12t_s$. Therefore the available communication time within 100 is reduced by the time that devices are scanning for available radar channel.

In light of the above discussion, it is clear that the current system and method for using a gateway 104, with multiple Wi-Fi APDs has flaws. There exists a need for using a gateway with multiple Wi-Fi APDs that reduces channel scanning time.

The present disclosure provides systems and methods for using a system, as exemplified by a gateway 104, and multiple Wi-Fi APDs to reduce channel scanning time.

In accordance with aspects of the present disclosure, a gateway 104 is configured to provide Wi-Fi network access to an end-user through a first Wi-Fi APD or a second Wi-Fi APD. The Wi-Fi network gateway 104 is able to operate over spectrum of channels in a radar band of IEEE Standard 802.11h. The Wi-Fi network gateway is able to operate in the radar band surrounding 5.0 GHz by using Dynamic Frequency Selection (DFS). DFS refers to a mechanism that allows unlicensed devices to share the 5.0 GHz frequency bands which have been allocated to radar systems without causing interference to those radars. In light of this, when the presence of a radar signal on one of the frequency bands is detected, the unlicensed device, such as the Wi-Fi network gateway described above, must stop using the channel.

The Wi-Fi network gateway will delegate the first Wi-Fi APD to monitor for the presence of a radar signal in a first set of channels within the spectrum and delegate the second Wi-Fi APD to monitor for the presence of a radar signal in a second set of channels within the spectrum.

In an example embodiment, each Wi-Fi APD will continually scan their delegated set of channels within the spectrum until the presence of a radar signal is detected. Once the presence of a signal is detected on a channel, the Wi-Fi APD that detected the presence will transmit a channel-in-use signal to the Wi-Fi network gateway. Upon receiving the channel-in-use signal, the Wi-Fi network gateway will transmit a notification signal to each of the Wi-Fi APDs in order to instruct them that they should not use the in-use channel.

Further, at a later time, the Wi-Fi APD that detected the presence of a radar signal on one of its delegated channels may detect that there is no longer a radar signal on the channel. The Wi-Fi APD may then transmit an updated channel-in-use signal to the Wi-Fi network gateway. Upon receiving the updated channel-in-use signal, the Wi-Fi network gateway may transmit an updated notification signal to each Wi-Fi APD in order to instruct them that the channel may be used.

An aspect of the present disclosure also proposes a method of load balancing. The Wi-Fi network gateway is able to determine the amount of data being transmitted on each individual channel within the available set of channels being monitored by the first Wi-Fi APD and the second Wi-Fi APD respectively. If the Wi-Fi network gateway detects that there is a large difference in traffic between two different channels, the Wi-Fi network gateway may redistribute the load to optimize the network.

Advantages of the systems and methods for using a network gateway with multiple Wi-Fi APDs of the present disclosure include: an optimization of resources; and each APD scans its own pool of channels rather than all of the channels in the 5.0 GHz frequency range. This optimization of resources reduces the channel scanning burden for each Wi-Fi APD and additionally reduces detection latency when transmitting a channel-in-use signal to the Wi-Fi network gateway. Another advantage is the load-balancing performed by the Wi-Fi network gateway that reduces network and channel congestion.

A high-level description of a system and method for using a gateway and multiple Wi-Fi APDs to optimize channel scanning in accordance with the present disclosure is as follows.

First, an end-user obtains a network gateway and configures it for use with multiple Wi-Fi APDs to provide Wi-Fi access.

The network gateway then delegate each Wi-Fi APD in the network to monitor its own unique pool of channels for the presence of a radar signal. If a Wi-Fi APD detects the presence of a radar signal, it will notify the network gateway which will in turn notify all other Wi-Fi APDs that the channel on which a radar signal was detected is in use.

Finally, the network gateway will then monitor the amount of traffic on each channel that the Wi-Fi APDs are operating on and perform load balancing in order to prevent network and channel congestion.

Aspects of the present disclosure will now be described with reference to FIGS. 4-9.

A first example embodiment of a system and method of accelerating and optimizing channel scanning in a wireless communication system will now be described with reference to FIGS. 4-9.

Figure 4:
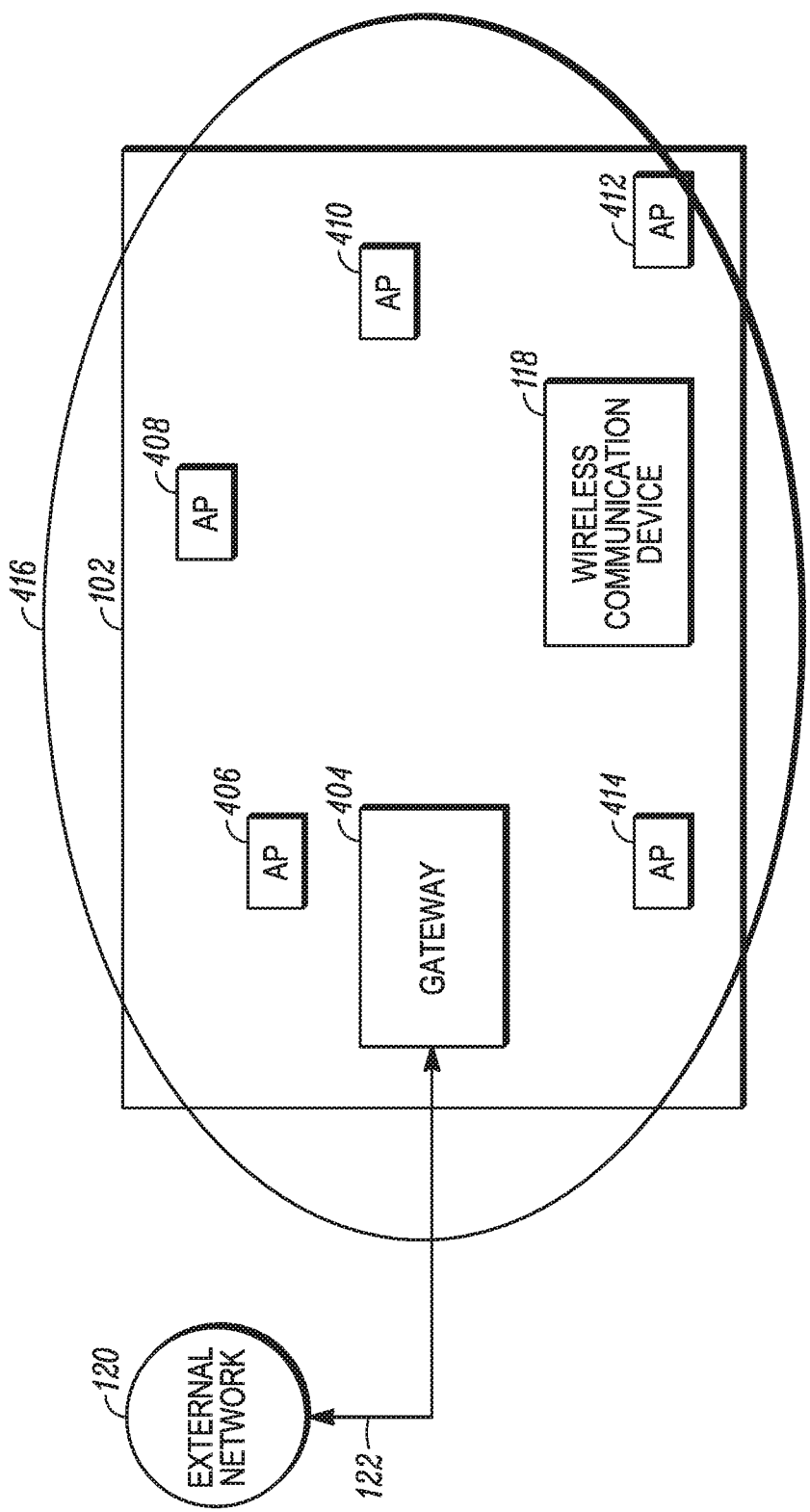
FIG. 4 illustrates a wireless communication system in accordance with aspects of the present disclosure.
Figure 5:
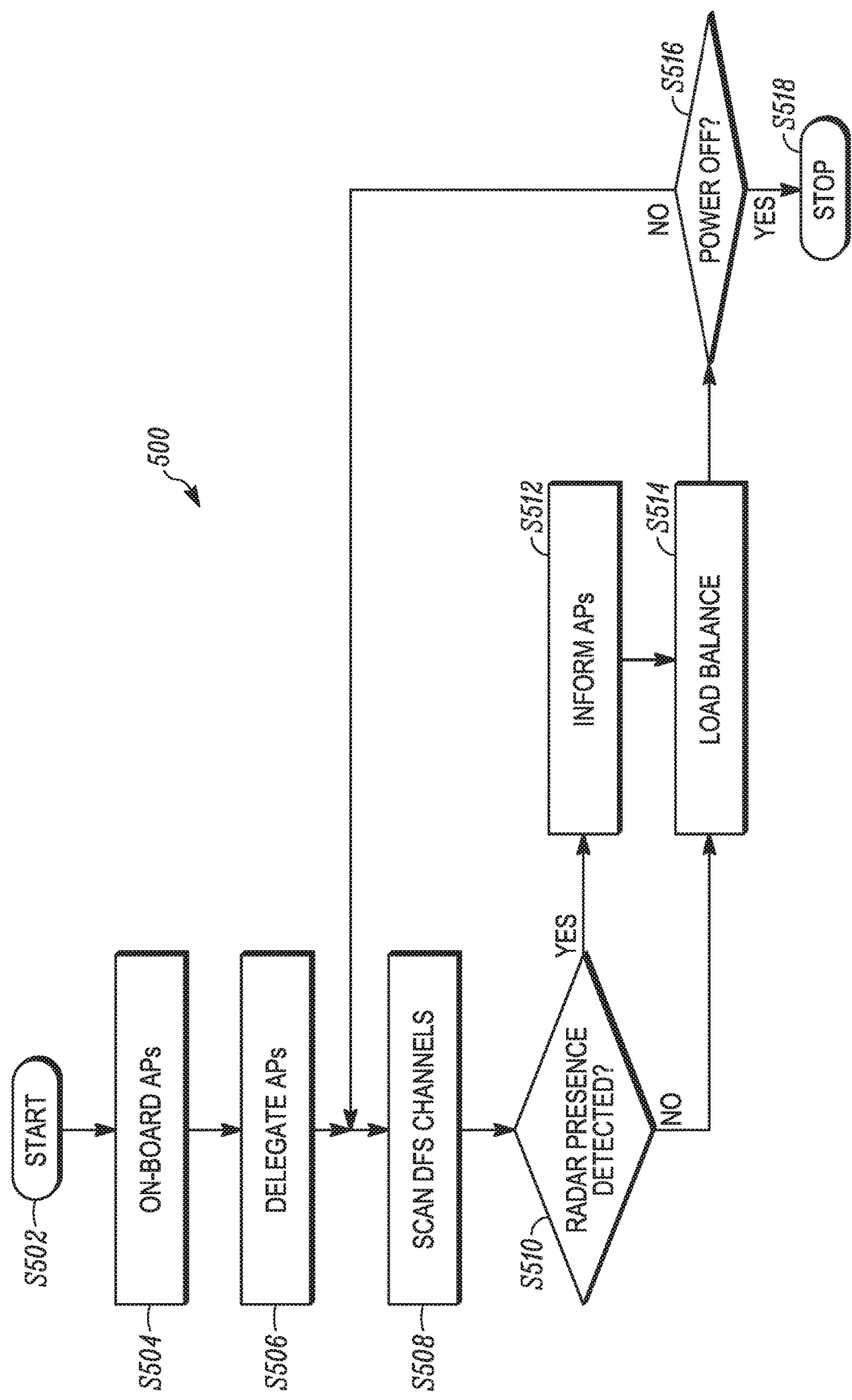
FIG. 5 illustrates an example method for using a gateway to control multiple Wi-Fi access point devices in accordance with aspects of the present disclosure.

FIG. 4 illustrates a wireless communication system 400 in accordance with aspects of the present disclosure.

As shown in the figure, wireless communication system 400 includes building 102, wireless communication device 118, external network 120, a gateway 404, a Wi-Fi APD 406, a Wi-Fi APD 408, a Wi-Fi APD 410, a Wi-Fi APD 412, and a Wi-Fi APD 412.

In this example, wireless communication device 118, external network 120, gateway 404, Wi-Fi APD 406, Wi-Fi APD 408, Wi-Fi APD 410, Wi-Fi APD 412, and Wi-Fi APD 412 are illustrated as individual devices. However, in some embodiments, at least two of wireless communication device 118, external network 120, gateway 404, Wi-Fi APD 406, Wi-Fi APD 408, Wi-Fi APD 410, Wi-Fi APD 412, and Wi-Fi APD 412 may be combined as a unitary device. Further, in some embodiments, at least one of wireless communication device 118, external network 120, gateway 404, Wi-Fi APD 406, Wi-Fi APD 408, Wi-Fi APD 410, Wi-Fi APD 412, and Wi-Fi APD 412 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an application specific integrated circuit ("ASIC"). In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

The OSI model includes seven independent protocol layers: (1) Layer 1, the physical layer, which defines electrical and physical specifications for devices, and the relationship between a device and a transmission medium, such as a copper or fiber optical cable; (2) Layer 2, the data link layer, which provides the functional and procedural means for the transfer of data between network entities and the detection and correction of errors that may occur in the physical layer; (3) Layer 3, the network layer, which provides the functional and procedural means for transferring variable length data sequences from a source host on one network to a destination host on a different network (in contrast to the data link layer which connects hosts within the same network), and performs network routing functions and sometimes fragmentation and reassembly; (4) Layer 4, the transport layer, which provides transparent transfer of data between end users, providing reliable data transfer services to the upper layers by controlling the reliability of a given link through flow control, segmentation/desegmentation, and error control; (5) Layer 5, the session layer, which controls the connections (interchanges) between computers, establishing, managing and terminating the connections between the local and remote applications; (6) Layer 6, the presentation layer, which establishes context between application layer entities, by which the higher-layer entities may use different syntax and semantics when the presentation service provides a mapping between them; and (7) Layer 7, the application layer, which interacts directly with the software applications that implement the communicating component.

Generic Stream Encapsulation (GSE) provides a data link layer protocol, which facilitates the transmission of data from packet oriented protocols (e.g., Internet protocol or IP) on top of a unidirectional physical layer protocol (e.g., DVB-S2, DVB-T2 and DVB-C2). GSE provides functions/characteristics, such as support for multi-protocol encapsulation (e.g., IPv4, IPv6, MPEG, ATM, Ethernet, VLANs, etc.), transparency to network layer functions (e.g., IP encryption and IP header compression), and support of several addressing modes, a mechanism for fragmenting IP datagrams or other network layer packets over baseband frames, and support for hardware and software filtering.

In a layered system, a unit of data that is specified in a protocol of a given layer (e.g., a "packet" at the network layer), and which includes protocol-control information and possibly user data of that layer, is commonly referred to as a "protocol data unit" or PDU. At the network layer, data is formatted into data packets (e.g., IP datagrams, Ethernet Frames, or other network layer packets).

Gateway 404 may be any device of system that is operable to allow data to flow from a network including gateway 404, Wi-Fi APD 406, Wi-Fi APD 408, Wi-Fi APD 410, Wi-Fi APD 412, or Wi-Fi APD 414 to external network 120 via communication channel 122. Gateway 404 may perform such functions as link layer and physical layer outroute coding and modulation (e.g., DVB S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway 404 may be any device or system that is additionally operable to delegate any one of Wi-Fi APD 406, Wi-Fi APD 408, Wi-Fi APD 410, Wi-Fi APD 412, or Wi-Fi APD 414 to monitor for the presence of a first signal on any one of a first set of channels within a spectrum of channels in a radar band of IEEE Standard 802.11h, as will be described in greater detail below; delegate any one of Wi-Fi APD 406, Wi-Fi APD 408, Wi-Fi APD 410, Wi-Fi APD 412, or Wi-Fi APD 414 to monitor for the presence of a second signal on any one of a second set of channels within a spectrum of channels in the radar band of IEEE Standard 802.11h, as will be described in greater detail below; receive a channel-in-use signal from a first of Wi-Fi APD 406, Wi-Fi APD 408, Wi-Fi APD 410, Wi-Fi APD 412, or Wi-Fi APD 414, as will be described in greater detail below; transmitting a notification signal to a second of Wi-Fi APD 406, Wi-Fi APD 408, Wi-Fi APD 410, Wi-Fi APD 412, or Wi-Fi APD 414, as will be described in greater detail below; determine a communication volume on each of the first set of channels within a spectrum of channels in a radar band of IEEE Standard 802.11h, as will be described in greater detail below; generating an instruction to instruct each of Wi-Fi APD 406, Wi-Fi APD 408, Wi-Fi APD 410, Wi-Fi APD 412, or Wi-Fi APD 414 to not use the in-use channel, as will be described in greater detail below; transmitting the instruction to each of Wi-Fi APD 406, Wi-Fi APD 408, Wi-Fi APD 410, Wi-Fi APD 412, or Wi-Fi APD 414, as will be described in greater detail below; and receive a communication signal from one of Wi-Fi APD 406, Wi-Fi APD 408, Wi-Fi APD 410, Wi-Fi APD 412, or Wi-Fi APD 414 as a result of the transmission of the instruction, as will be described in greater detail below.

Wi-Fi APD 406, Wi-Fi APD 408, Wi-Fi APD 410, Wi-Fi APD 412, or Wi-Fi APD 414 may be any device or system that has on-boarding configuration information stored therein, the on-boarding configuration information including a factory-set network identifier and a factory-set network password and that is operable to allow wireless communication device 118 to connect to gateway 404, so as to connect to external network 120.

Wireless communication device 118 is able to wirelessly communicate with Wi-Fi APD 406, Wi-Fi APD 408, Wi-Fi APD 410, Wi-Fi APD 412, and Wi-Fi APD 414 as will be described in more detail below. Wi-Fi APD 406, Wi-Fi APD 408, Wi-Fi APD 410, Wi-Fi APD 412, or Wi-Fi APD 414 are able to additionally communicate with gateway 404. Gateway 404 is able to communicate with external network 120 by way of a communication channel 122, which may be any known type of communication channel, non-limiting example of which include a wired and wireless communication channel.

An example method 500 for controlling multiple Wi-Fi access point devices in accordance with aspects of the present disclosure will now be described with additional reference to FIGS. 5-9.

As shown in the figure, method 500 starts (S502) and Wi-Fi APDs are on-boarded (S504). In an example embodiment, gateway 404 will on-board each Wi-Fi APD in range that is to provide access to the external network. This will be described in greater detail with reference to FIGS. 6-8.

Figure 6:
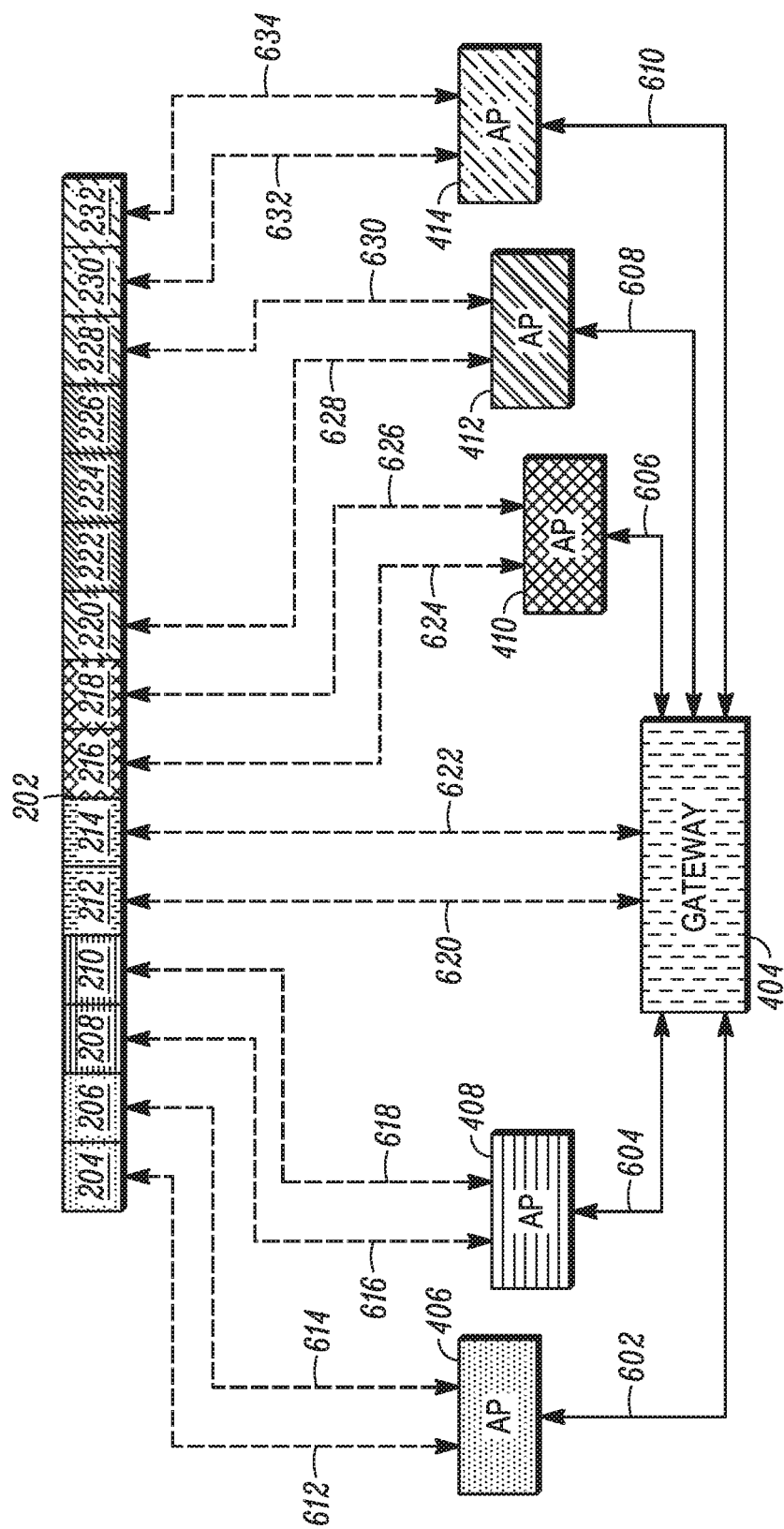
FIG. 6 illustrates the operation of the wireless communication system of FIG. 4 in accordance with aspects of the present disclosure.

FIG. 6 illustrates wireless communication system 400 operating in accordance with aspects of the present disclosure.

As shown, the figure includes gateway 404, Wi-Fi APD 406, Wi-Fi APD 408, Wi-Fi APD 410, Wi-Fi APD 412, and Wi-Fi APD 414, and spectrum 202.

Figure 7:
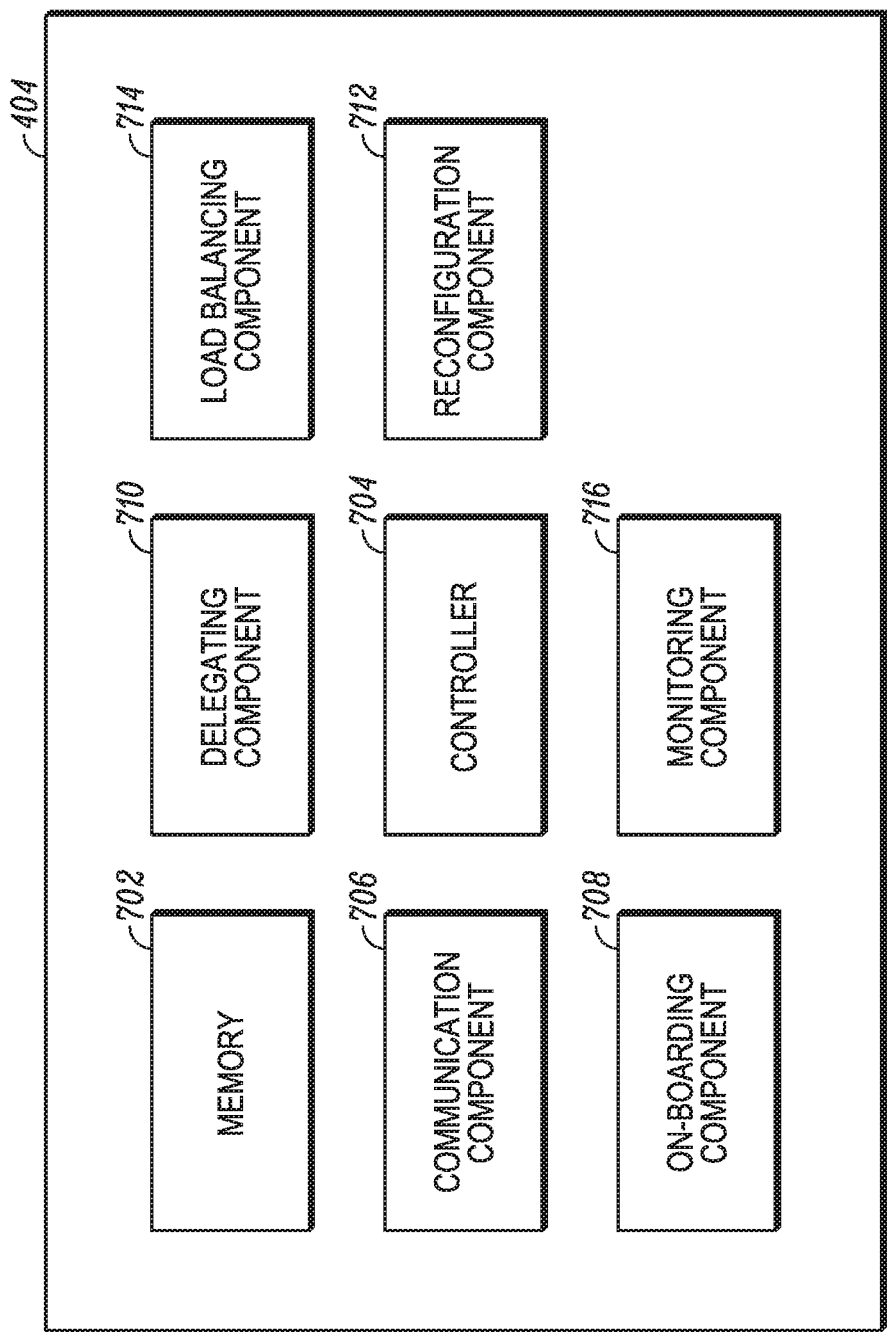
FIG. 7 illustrates an exploded view of the gateway of FIG. 4 in accordance with aspects of the present disclosure.

FIG. 7 illustrates an exploded view of a network system, as exemplified by gateway 404, in accordance with aspects of the present disclosure.

As shown in the figure, gateway 404 includes a memory 702, a controller 704, a communication component 706, an on-boarding component 708, a delegating component 710, a reconfiguration component 712, a load balancing component 714, and a monitoring component 716.

In this example, memory 702, controller 704, communication component 706, on-boarding component 708, delegating component 710, reconfiguration component 712, load balancing component 714, and monitoring component 716 are illustrated as individual devices. However, in some embodiments, at least two of memory 702, controller 704, communication component 706, on-boarding component 708, delegating component 710, reconfiguration component 712, load balancing component 714, and monitoring component 716 may be combined as a unitary device. Further, in some embodiments, at least one of memory 702, controller 704, communication component 706, on-boarding component 708, delegating component 710, reconfiguration component 712, load balancing component 714, and monitoring component 716 may be implemented as a computer having tangible computer-readable media for carrying or having computer-executable instructions or data structures stored thereon.

When gateway 404 is prepared for shipment from the manufacturer, the on-boarding configuration information is stored in memory 702.

Memory 702 may be any device or system that is able to have on-boarding configuration information stored therein, wherein the on-boarding configuration information includes a factory-set network identifier and a factory-set network password. Non-limiting examples of memory 702 include any known physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Wi-Fi device driver or Wi-Fi APD firmware may be stored as a program/utility, having a set (at least one) of program modules, stored in memory 702 as well as an operating system, one or more application programs, other program modules, and program data. The program modules within memory 702 may be access by controller 704 to carry out the Wi-Fi automatic on-boarding functions of various embodiments of the application as described herein.

The Wi-Fi device driver or Wi-Fi APD firmware includes the on-boarding configuration information, which is information that is needed by a Wi-Fi APD to establish a Wi-Fi connection with gateway 404. The on-boarding configuration information includes a network identifier, a network password, an SSID, passphrase, security mode, login username, login password and BSSID. When prepared for shipment, the manufacturer establishes initial settings for this information as factory-set settings, some of which may be changed by an authorized user at a later time. In particular, an initial network identifier is provided as a factory-set network identifier and an initial network password is provided as a factory-set network password.

Controller 704 may be any device or system that is operable to control the operation of each of memory 702, communication component 706, on-boarding component 708, delegating component 710, reconfiguration component 712, load balancing component 714, and monitoring component 716.

Communication component 706 may be any device or system that is operable to communicate externally with another device or network. Communication component 706 may be any device or system that is operable to: receive a channel-in-use signal from a first Wi-Fi APD, as will be described in greater detail below; transmit a notification signal based on the channel-in-use signal to a second Wi-Fi APD, as will be described in greater detail below; transmit an instruction signal to a first and a second Wi-Fi APD, as will be described in greater detail below; receive a communication signal from one of a first Wi-Fi APD or second Wi-Fi APD based on the transmission of the instruction signal, as will be described in greater detail below; and to receive an updated channel-in-use signal from the first Wi-Fi APD and to transmit an updated notification signal to the second Wi-Fi APD based on the updated channel-in-use signal, as will be described in greater detail below.

On-boarding component 708 may be any device or system that is operable to on-board a Wi-Fi APD.

Delegating component 710 may be any device or system that is operable to delegate a first Wi-Fi APD to monitor for the presence of a first signal on any one of a first set of channels within a spectrum of channels in a radar band of IEEE Standard 802.11h and to delegate a second Wi-Fi APD to monitor for the presence of a second signal on any one of a second set of channels within a spectrum of channels in the radar band of IEEE Standard 802.11h, as will be described in greater detail below.

Reconfiguration component 712 may be any device or system that is operable to instruct a first Wi-Fi APD and a second Wi-Fi APD to not use a first one of the first set of channels within the spectrum of channels in the radar band of IEEE Standard 802.11h based on the receipt of the channel-in-use signal from the first Wi-Fi APD, as will be described in greater detail below.

Load balancing component 714 may be any device or system that is operable to: determine a communication volume on each of the first set of channels within the spectrum of channels in the radar band of IEEE Standard 802.11h and the second set of channels within the spectrum of channels in the radar band of IEEE Standard 802.11h, as will be described in greater detail below; and generate an instruction to instruct the first Wi-Fi APD and the second Wi-Fi APD to not use the in-use channel; and determine an updated communication volume on each of the first set of channels within the spectrum of channels in the radar band of IEEE Standard 802.11h and the second set of channels within the spectrum of channels in the radar band of IEEE Standard 802.11h, as will be described in greater detail below.

Monitoring component 716 may be any device or system that is operable to monitor for the presence of a radar signal on any one of a third set of channels within the spectrum of channels in the radar band of IEEE Standard 802.11h.

After the on-boarding configuration information is stored, gateway 404 may be shipped for purchase. Eventually, gateway 404 is purchased by an end user, is unpackaged and is prepared for use in a Wi-Fi network.

Figure 8:
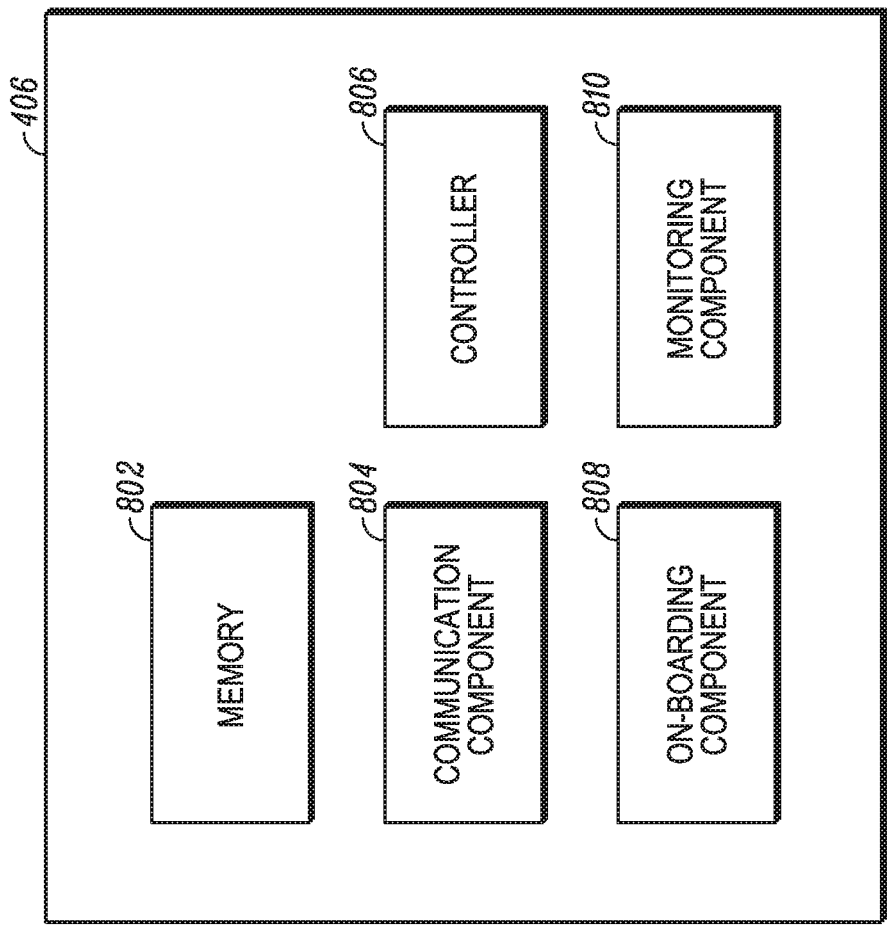
FIG. 8 illustrates an exploded view of the Wi-Fi access point device (APD) of FIG. 4, in accordance with aspects of the present disclosure.

FIG. 8 illustrates an exploded view of Wi-Fi APD 406 in accordance with aspects of the present disclosure.

As shown, Wi-Fi APD 406 includes a memory 802, a communication component 804, a controller 804, an on-boarding component 808, and a monitoring component 810.

In this example, memory 802, communication component 804, controller 804, on-boarding component 808, and monitoring component 810 are illustrated as individual devices. However, in some embodiments, at least two of memory 802, communication component 804, controller 804, on-boarding component 808, and monitoring component 810 may be combined as a unitary device. Further, in some embodiments, at least one of memory 802, communication component 804, controller 804, on-boarding component 808, and monitoring component 810 may be implemented as a computer having tangible computer-readable media for carrying or having computer-executable instructions or data structures stored thereon.

When Wi-Fi APD 406 is prepared for shipment from the manufacturer, the on-boarding configuration information is stored in memory 802.

Memory 802 may be any device or system that is able to have on-boarding configuration information stored therein, wherein the on-boarding configuration information includes a factory-set network identifier and a factory-set network password. Non-limiting examples of memory 802 include any known physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Wi-Fi device driver or Wi-Fi APD firmware may be stored as a program/utility, having a set (at least one) of program modules, stored in memory 802 as well as an operating system, one or more application programs, other program modules, and program data. The program modules within memory 802 may be access by controller 806 to carry out the Wi-Fi automatic on-boarding functions of various embodiments of the application as described herein.

The Wi-Fi device driver or Wi-Fi APD firmware includes the on-boarding configuration information, which is information that is needed by a Wi-Fi communication device to establish a Wi-Fi connection with Wi-Fi APD 406. The on-boarding configuration information includes a network identifier, a network password, an SSID, passphrase, security mode, login username, login password and BSSID. When prepared for shipment, the manufacturer establishes initial settings for this information as factory-set settings, some of which may be changed by an authorized user at a later time. In particular, an initial network identifier is provided as a factory-set network identifier and an initial network password is provided as a factory-set network password.

Controller 806 may be any device or system that is operable to control the operation of each of memory 802, communication component 804, on-boarding component 808, and monitoring component 810.

Communication component 804 may be any device or system that is operable to communicate externally with another device or network.

On-boarding component 808 may be any device or system that is operable to on-board a Wi-Fi APD.

Monitoring component 810 may be any device or system that is operable to monitor for the presence of a radar signal on any one of a third set of channels within the spectrum of channels in the radar band of IEEE Standard 802.11h.

After the on-boarding configuration information is stored, Wi-Fi APD 406 may be shipped for purchase. Eventually, Wi-Fi APD 406 is purchased by an end user, is unpackaged and is prepared for use in a Wi-Fi network. Similarly, Wi-Fi APD 408, Wi-Fi APD 410, Wi-Fi APD 412, and Wi-Fi APD 414 are purchased by an end user, are unpackaged and prepared for use in a Wi-Fi network.

Referring back to FIG. 6, once the gateway and Wi-Fi APDs are purchased and setup by an end user, the gateway will need to on-board each Wi-Fi APD. Many on-boarding processes are known in the state of the art, and for purposes of brevity, only a high level description of the on-boarding process will be discussed.

To begin the on-boarding process, an end user powers-on gateway 404, and Wi-Fi APD 406. Next, the end-user will obtain a unique and individual product identifier key or password from gateway 404 by transmitting an on-boarding signal from their wireless communication device to communication component 706. The on-boarding signal is then sent to on-boarding component 708 in order to instruct gateway 404 to begin the on-boarding process.

Next, with the on-boarding process started, an identifier key or password is retrieved from memory 702 and transmitted to the end-users wireless communication device via communication component 706. With the identifier key or password obtained, the end-user will login to a user-interface associated with Wi-Fi APD 406.

The end-user will then use the user-interface to transmit the identifier key or password of gateway 404 as an on-boarding signal to communication component 804 of Wi-Fi APD 406. The on-boarding signal is passed to on-boarding component 808 which will instruct Wi-Fi APD 406 to begin the on-boarding processes using the identifier key or password contained within the on-boarding signal. On-boarding component 808 will then configure its settings using the identifier key or password in order to access gateway 404 and enable communication. Finally, the identifier key or password is sent to be stored by memory 802.

The process of on-boarding Wi-Fi APD 408, on-boarding Wi-Fi APD 410, on-boarding Wi-Fi APD 412, and on-boarding Wi-Fi APD 414 are identical to the process of on-boarding Wi-Fi APD 406 as described above.

Returning to FIG. 5, after the Wi-Fi APDs are on-boarded (S504), channels for monitoring are delegated to Wi-Fi APDs. In an example embodiment, gateway 404 will delegate channels to be monitored by each of Wi-Fi APD 406, Wi-Fi APD 408, Wi-Fi APD 410, Wi-Fi APD 412, and Wi-Fi APD 414. This will be described with additional reference to FIG. 7.

As shown in FIG. 7, delegating component 710 will generate a delegation signal that will instruct each Wi-Fi APD to monitor a set of channels within spectrum 202. The delegation signal will divide the total number of channels to be monitored within spectrum 202 over the total number of Wi-Fi APDs as well as gateway 404 itself. In this manner, all of the channels in spectrum 202 can be monitored more efficiently than each device monitoring all of the channels in spectrum 202 independently. Once the delegation signal is generated, it will be transmitted to each Wi-Fi APD by communication component 706.

Additionally, in this example embodiment, gateway 404 is equipped to act as both a gateway and an access point device, and as such is able to scan channels within spectrum 202. In other embodiments, gateway 404 may only act as a gateway and not an access point device. In this case, the scanning of channels would only be delegated to the Wi-Fi APDs. In this embodiment gateway 404 is operable to act as an access point device and delegate the scanning of channels within spectrum 202 to itself in addition to each Wi-Fi APD. To perform the scanning of channels, the delegation signal is sent to controller 704 which will instruct monitoring component 716 to scan channel 212 and channel 214 of spectrum 202.

Returning to FIG. 6, the delegation signal is transmitted to Wi-Fi APD 406 via communication channel 602, Wi-Fi APD 408 via communication channel 604, Wi-Fi APD 410 via communication channel 606, Wi-Fi APD 412 via communication channel 608, and Wi-Fi APD 414 via communication channel 610.

Referring briefly to FIG. 8, using Wi-Fi APD 406 as an example, the delegation signal is received by communication component 804 of Wi-Fi APD 406. The delegation signal is then sent to controller 806, which will in turn instruct monitoring component 810 to only monitor the channels specified in the delegation signal. In this example embodiment, monitoring component 810 is to only monitor channel 204 and channel 206 of spectrum 202.

Returning to FIG. 5, after channels for monitoring are delegated to Wi-Fi APDs, the channels are scanned (S508). In an example embodiment, each of Wi-Fi APD 406, Wi-Fi APD 408, Wi-Fi APD 410, Wi-Fi APD 412, and Wi-Fi APD 414 will scan only the channels specified by their respectively received delegation signal. This will be described with additional reference to FIG. 6.

As shown in FIG. 6, the gateway and each Wi-Fi APD begins scanning the channels that were delegated to them. In an example embodiment, gateway 404 begins scanning channel 212 and channel 214 as shown by line 620 and line 622. Wi-Fi APD 406 begins scanning channel 204 and channel 206 as shown by line 612 and line 614, Wi-Fi APD 408 begins scanning channel 208 and channel 210 as shown by line 616 and line 618, Wi-Fi APD 410 begins scanning channel 216 and channel 218 as shown by line 624 and line 626, Wi-Fi APD 412 begins scanning channel 220 and channel 228 as shown by line 628 and line 630, and Wi-Fi APD 414 begins scanning channel 230 and channel 232 as shown by line 632 and line 634.

Gateway 404, Wi-Fi APD 406, Wi-Fi APD 408, Wi-Fi APD 410, Wi-Fi APD 412, or Wi-Fi APD 414 will continue to scan their delegated channels for the presence of radar signals in this manner.

Returning to FIG. 5, after the DFS channels are scanned (S508) it is determined whether the presence of a radar signal is detected (S510). For example, as shown in FIG. 7, communication component 706 of gateway 404 tunes to a channel and listens for activity on that channel, thus deeming it to be used based on reception. The volume of activity on a channel thus also indicates the busyness/load of/on the channel. Similarly, as shown in FIG. 8, communication component 804 of Wi-Fi APD 406 tunes to a channel and listens for activity on that channel, thus deeming it to be used based on reception.

Returning to FIG. 5, if the presence of a radar signal is not detected (N at S510), then gateway 404 will perform load balancing (S514).

For example, returning to FIG. 7, if a radar signal is not detected on any channel within spectrum 202, gateway 404 must perform load balancing. Load balancing component 714 is continually monitoring the communication volume on each channel within spectrum 202. Suppose for example, that Wi-Fi APD 406 and Wi-Fi APD 408 are both operating on channel 208 creating a high volume of communications on the channel. In this case, load balancing component 714 would transmit the communication volume to reconfiguration component 712. Reconfiguration component 712 would then determine that Wi-Fi APD 406 should begin operating on channel 204 in order to reduce the load on channel 208.

At this time, reconfiguration component 712 will generate an instruction signal based on the determination that Wi-Fi APD 406 should begin operating on channel 204. Once generated, the instruction signal will be sent to communication component 706, which will transmit the signal to Wi-Fi APD 406. Referring briefly to FIG. 8, the instruction signal will be received by communication component 804 of Wi-Fi APD 406. Once received, communication component 804 will in turn begin operating on channel 204 instead of channel 208.

Returning to FIG. 5, if the presence of a radar signal is detected (Y at S510), gateway 404 will inform each of the Wi-Fi APDs of a detected radar signal (S512). This will be described in greater detail with additional reference to FIG. 9.

Figure 9:
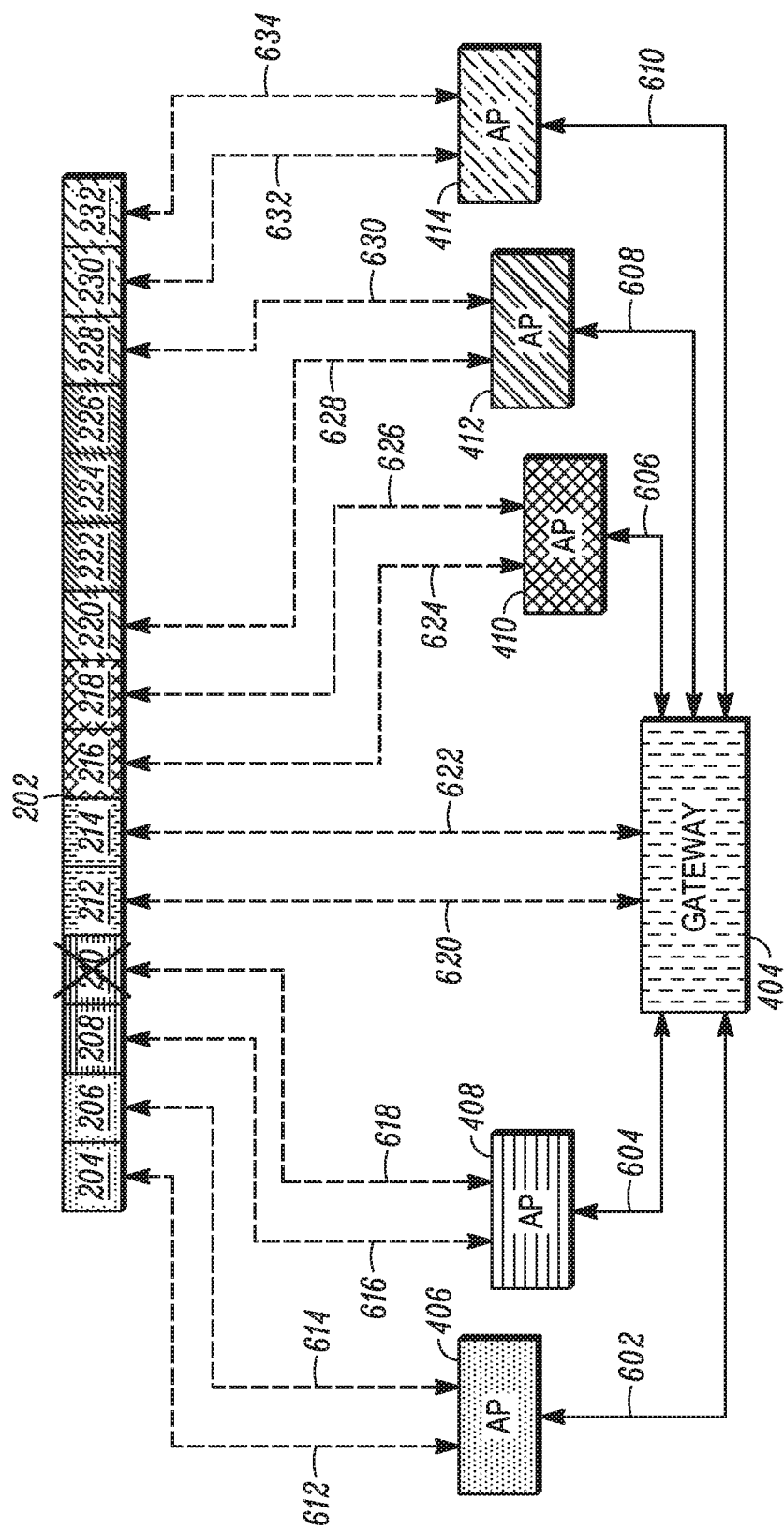
FIG. 9 illustrates the operation of the wireless communication system of FIG. 4 in accordance with aspects of the present disclosure.

As shown in FIG. 9, a radar signal is transmitted on channel 210 of spectrum 202 by an external source (not shown). Wi-Fi APD 408 is responsible for the monitoring of channel 208 and channel 210.

In the prior art system discussed above with reference to FIG. 3, each device would need to scan 12 channels, wherein each channel scanned required a scanning time ts. Accordingly, each device would spend a total scanning time of 12 $t_s$ to scan spectrum 202. However, in accordance with aspects of the present disclosure, each device need only scan 2 channels, wherein each channel scanned requires a scanning time $t_s$. Accordingly, in accordance with aspects of the present disclosure, each device would spend a total scanning time of 2 $t_s$ to scan spectrum 202. Since Wi-Fi APD 408 is only responsible for monitoring two channels instead of every channel in spectrum 202, it is able to spend less time scanning for an in-use channel and have more time available for communication with wireless communication device 118.

Returning to FIG. 5, once the presence of a radar signal is detected (Y at S510), gateway 404 will inform all Wi-Fi APDs of the detection (S512). For example, as shown in FIG. 9, once gateway 404 receives the channel-in-use signal from Wi-Fi APD 408, it will generate a notification signal to be transmitted to each of Wi-Fi APD 406, Wi-Fi APD 408, Wi-Fi APD 410, Wi-Fi APD 412, and Wi-Fi APD 414.

Returning to FIG. 7, the channel-in-use signal from Wi-Fi APD 408 is received by communication component 706 and then sent to reconfiguration component 712. Upon receiving the channel-in-use signal, reconfiguration component 712 will generate a notification signal that will instruct a Wi-Fi APD that the presence of a radar signal has been detected on channel 210 and that the channel should not be used. Once generated, the notification signal is sent to communication component 706, which then transmits the signal to each of Wi-Fi APD 406, Wi-Fi APD 408, Wi-Fi APD 410, Wi-Fi APD 412, and Wi-Fi APD 414.

Referring to FIG. 8, once transmitted, the notification signal is received by communication component 804 of Wi-Fi APD 406. Communication component 804 then delivers the notification signal to controller 806. Controller 806 analyzes the notification signal and then instructs communication component 804 to stop using channel 210 for communications.

Returning briefly to FIG. 4, suppose for purposes of discussion that an end-user is using wireless communication device 118 to access external network 120 via Wi-Fi APD 412. Also suppose, for purposes of discussion, that Wi-Fi APD 412 is transmitting data between wireless communication device 118 and gateway 404 over channel 210. When Wi-Fi APD 408 detects the presence of a radar signal on channel 210, as discussed above in reference to FIG. 9, when Wi-Fi APD 412 receives the notification signal, it will begin transmitting data between wireless communication device 118 and gateway 404 over a different channel, such as channel 218. In this manner, the end-user is still able to access external network 120 without interruption while simultaneously not interfering with radar communications on channel 210.

Returning to FIG. 5, once the Wi-Fi APDs have been informed of the presence of a radar signal (S512), gateway 404 will perform load balancing (S514). For purposes of discussion, suppose that several end-users are also accessing external network 120, via Wi-Fi APD 410 and Wi-Fi APD 414, each of which are transmitting data between various end-users and gateway 404 via channel 218. With three Wi-Fi APDs operating on channel 218, gateway 404 may perform load balancing by any known load balancing method. A general description of load balancing will be further described with reference to FIG. 7.

As shown in FIG. 7, with three Wi-Fi APDs operating on channel 218, load balancing component 714 will detect a communication volume for data being transmitted throughout the channels in spectrum 202. Load balancing component 714 will then send the communication volume to reconfiguration component 712 which will generate an instruction signal to instruct the three Wi-Fi APDs to use different channels in order to distribute the amount of data being transferred more evenly across the channels of spectrum 202.

In this embodiment, the instruction signal instructs Wi-Fi APD 410 to use channel 216, Wi-Fi APD 412 to continue using channel 218, and Wi-Fi APD 414 to use channel 232. Reconfiguration component 712 then sends the instruction signal to communication component 706, which transmits the signal to each of Wi-Fi APD 410, Wi-Fi APD 412, and Wi-Fi APD 414. Once each of Wi-Fi APD 410, Wi-Fi APD 412, and Wi-Fi APD 414 receive the instruction signal, they begin operating on their instructed channels.

Returning to FIG. 5, after load balancing has been performed (S514), if there is still power to gateway 404 (N at S516), THEN the channels of spectrum 202 will continue to be scanned (return to S508). If there is not power to gateway 404 (Y at S516), method 500 stops (S518).

For purposes of discussion, suppose that as communication system 400 continues to scan the channels of spectrum 202 and that a radar signal is detected by Wi-Fi APD 414 on channel 232 in addition to the radar signal that was previously detected on channel 210 by Wi-Fi APD 408. In this embodiment, Wi-Fi APD 414 will transmit an updated channel-in-use signal to gateway 404. Gateway 404 will then generate an updated notification signal to instruct all of the Wi-Fi APDs that both channel 210 and channel 232 are in use.

When the Wi-Fi APDs receive the updated notification signal, if they are currently operating on either of channel 210 or channel 232 they will begin operating on different channels as instructed. If a Wi-Fi APDs switches channels, gateway 404 will need to perform load balancing once again. Gateway 404 will then use the communication volume on each remaining available channel 204, 206, 208, 212, 214, 216, 218, 220, 228, and 230 to determine an updated communication volume. Once the updated communication volume has been determined, gateway 404 will generate an updated notification signal, which it will then transmit to each of the Wi-Fi APDs. The Wi-Fi APDs will then begin operating on the channels designated within the updated notification signal.

Now, again for purposes of discussion, suppose that as the communication system continues to scan the channels of spectrum 202, the radar signal on channel 210 disappears. In this embodiment, once the radar signal on channel 210 is gone, APD 408 transmits an updated channel-in-use signal to gateway 404. Gateway 404 will then generate an instruction signal as described above, and transmit it to each Wi-Fi APD to instruct them that channel 210 is available. Gateway 404 may then additionally perform any load balancing while the channels of spectrum 202 are continued to be periodically scanned.

In the example embodiment discussed above with reference to FIG. 6, 5 ADSs are used. It should be noted that this is merely a non-limiting example and that any integer number of APDs greater zero may be used in accordance with aspects of the present invention. In cases where the number of APDs are greater than the number of channels to be scanned, then the remaining number of APDs that are not assigned to a channel to scan may be free to communicate without spending any time scanning channels.

In summary, the prior art methods for using a gateway to control multiple Wi-Fi access point devices is inefficient since the gateway and each Wi-Fi APD continually scan all channels within a spectrum independently. Additionally, this method introduces delays between when a radar signal is transmitted on a channel and its detection, resulting in interference as the Wi-Fi APDs continue to operate on the in-use channel.

Aspects of the present disclosure provide a system and method for optimizing the scanning of channels within the spectrum of channels within the radar band of IEEE Standard 802.11h. Each Wi-Fi APD scans its own pool of channels rather than all of the channels in the spectrum. This optimization reduces the channel scanning burden for each Wi-Fi APD and reduces radar signal detection latency. Another aspect of the present disclosure provides a system and method for load balancing to reduce channel strain and congestion.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed is:

1. A system for use with a first access point device and a second access point device, the system comprising:
   a delegating component operable to delegate the first access point device to monitor for a presence of a signal on any one of a first set of channels within a spectrum of channels in a radar band and to delegate the second access point device to monitor a second presence of a second signal on any one of a second set of channels within the spectrum of channels in the radar band;
   a communication component operable to receive a channel-in-use signal from the first access point device and to transmit a notification signal to the second access point device based on the channel-in-use signal, the channel-in-use signal being associated with an in-use channel of the first set of channels within the spectrum of channels in the radar band; and
   a load balancing component operable to determine a communication volume on each of the first set of channels within the spectrum of channels in the radar band and the second set of channels within the spectrum of channels in the radar band and to generate an instruction to instruct the first access point device and the second access point device to not use the in-use channel,
   wherein the communication component is further operable to transmit the instruction to the first access point device and the second access point device, and
   wherein the communication component is further operable to receive a communication signal from one of the first access point device and the second access point device as a result of a transmission of the instruction by the communication component.

2. The system of claim 1, further comprising a reconfiguration component operable to instruct the first access point device and the second access point device to not use a first one of the first set of channels within the spectrum of channels in the radar band based on a receiving of the channel-in-use signal from the first access point device.

3. The system of claim 2, further comprising a monitoring component operable to monitor for a third presence of a third signal on any one of a third set of channels within the spectrum of channels in the radar band.

4. The system of claim 3,
wherein the communication component is further operable to receive an updated channel-in-use signal from the first access point device and to transmit an updated notification signal to the second access point device based on the updated channel-in-use signal, and
wherein the load balancing component is further operable to determine an updated communication volume on each of the first set of channels within the spectrum of channels in the radar band and the second set of channels within the spectrum of channels in the radar band.

5. The system of claim 1, further comprising a monitoring component operable to monitor for a third presence of a third signal on any one of a third set of channels within the spectrum of channels in the radar band.

6. The system of claim 5,
wherein the communication component is further operable to receive an updated channel-in-use signal from the first access point device and to transmit an updated notification signal to the second access point device based on the updated channel-in-use signal, and
wherein said load balancing component is further operable to determine an updated communication volume on each of the first set of channels within the spectrum of channels in the radar band of IEEE Standard 802.11h and the second set of channels within the spectrum of channels in the radar band of IEEE Standard 802.11h.

7. The system of claim 1,
wherein the communication component is further operable to receive an updated channel-in-use signal from the first access point device and to transmit an updated notification signal to the second access point device based on the updated channel-in-use signal, and
wherein the load balancing component is further operable to determine an updated communication volume on each of the first set of channels within the spectrum of channels in the radar band and the second set of channels within the spectrum of channels in the radar band.

8. The system of claim 1, wherein the radar band is a radar band of IEEE Standard 802.11h.

9. A method of using a first access point device and a second access point device, the method comprising:
delegating, via a delegating component, the first access point device to monitor for a presence of a signal on any one of a first set of channels within a spectrum of channels in a radar band;
delegating, via the delegating component, the second access point device to monitor a second presence of a second signal on any one of a second set of channels within the spectrum of channels in the radar band;
receiving, via a communication component, a channel-in-use signal from the first access point device, the channel-in-use signal being associated with an in-use channel;
transmitting, via the communication component, a notification signal to the second access point device based on the channel-in-use signal;
determining, via a load balancing component, a communication volume on each of the first set of channels within the spectrum of channels in the radar band and the second set of channels within the spectrum of channels in the radar band;
generating, via the load balancing component, an instruction to instruct the first access point device and the second access point device to not use the in-use channel;
transmitting, via the communication component, the instruction to the first access point device and the second access point device, and
receiving, via the communication component, a communication signal from one of the first access point device and the second access point device as a result of the transmitting of the instruction.

10. The method of claim 9, further comprising instructing, via a reconfiguration component, the first access point device and the second access point device to not use a first one of the first set of channels within the spectrum of channels in the radar band based on a receiving of the channel-in-use signal from the first access point device.

11. The method of claim 10, further comprising monitoring, via a monitoring component, for a third presence of a third signal on any one of a third set of channels within the spectrum of channels in the radar band.

12. The method of claim 11, further comprising:
receiving, via the communication component, an updated channel-in-use signal from the first access point device;
transmitting, via the communication component, an updated notification signal to the second access point device based on the updated channel-in-use signal; and
determining, via the load balancing component, an updated communication volume on each of the first set of channels within the spectrum of channels in the radar band and the second set of channels within the spectrum of channels in the radar band.

13. The method of claim 9, further comprising monitoring, via a monitoring component, for a third presence of a third signal on any one of a third set of channels within the spectrum of channels in the radar band.

14. The method of claim 13, further comprising:
receiving, via the communication component, an updated channel-in-use signal from the first access point device;
transmitting, via the communication component, an updated notification signal to the second access point device based on the updated channel-in-use signal; and
determining, via the load balancing component, an updated communication volume on each of the first set of channels within the spectrum of channels in the radar band and the second set of channels within the spectrum of channels in the radar band.

15. The method of claim 9, further comprising:
receiving, via the communication component, an updated channel-in-use signal from the first access point device;
transmitting, via the communication component, an updated notification signal to the second access point device based on the updated channel-in-use signal; and
determining, via the load balancing component, an updated communication volume on each of the first set of channels within the spectrum of channels in the radar band and the second set of channels within the spectrum of channels in the radar band.

16. The method of claim 9, wherein the radar band is a radar band of IEEE Standard 802.11h.

17. A non-transitory, tangible, computer-readable medium storing computer-readable instructions that, when executed by one or more computer processors, cause the one or more computer processors to perform steps of a method of using a first access point device and a second access point device, the method comprising:

delegating, via a delegating component, the first access point device to monitor for a presence of a signal on any one of a first set of channels within a spectrum of channels in a radar band;

delegating, via the delegating component, the second access point device to monitor a second presence of a second signal on any one of a second set of channels within the spectrum of channels in the radar band;

receiving, via a communication component, a channel-in-use signal from the first access point device, the channel-in-use signal being associated with an in-use channel;

transmitting, via the communication component, a notification signal to the second access point device based on the channel-in-use signal;

determining, via a load balancing component, a communication volume on each of the first set of channels within the spectrum of channels in the radar band and the second set of channels within the spectrum of channels in the radar band;

generating, via the load balancing component, an instruction to instruct the first access point device and the second access point device to not use the in-use channel;

transmitting, via the communication component, the instruction to the first access point device and the second access point device, and receiving, via the communication component, a communication signal from one of the first access point device and the second access point device as a result of the transmitting of the instruction.

18. The non-transitory, tangible, computer-readable medium of claim 17, wherein the radar band is a radar band of IEEE Standard 802.11h.

* * * * *